United States Patent [19]

Brandon et al.

[11] Patent Number: 5,449,329
[45] Date of Patent: Sep. 12, 1995

[54] METHOD FOR CONTROLLING TRANSMISSION CONTROL CLUTCHES

[75] Inventors: David E. Brandon; Peter L. Falck; Dennis L. Jeffries, all of Waterloo, Iowa

[73] Assignee: Deere & Company, Moline, Ill.

[21] Appl. No.: 95,434

[22] Filed: Aug. 20, 1993

[51] Int. Cl.$^6$ .................. B60K 41/08; F16D 43/20; F16H 5/46
[52] U.S. Cl. .......................... 477/70; 477/76; 477/86; 477/143; 364/424.1
[58] Field of Search .............. 477/70, 76, 78, 86, 477/174, 143; 364/424.1

[56] References Cited

U.S. PATENT DOCUMENTS

| | | | |
|---|---|---|---|
| 4,855,913 | 8/1989 | Brekkestran et al. | 364/424.1 |
| 4,989,471 | 2/1991 | Bulgrien | 74/236 K |
| 5,036,729 | 8/1991 | Nitz et al. | 364/424.1 X |
| 5,046,174 | 9/1991 | Lentz et al. | 364/424.1 |
| 5,072,390 | 12/1991 | Lentz et al. | 364/424.1 |
| 5,082,097 | 1/1992 | Goeckner et al. | 192/32 |
| 5,083,648 | 1/1992 | Bulgrien | 74/335 |
| 5,086,665 | 2/1992 | Milunas et al. | 477/143 X |

OTHER PUBLICATIONS

SAE Technical Paper Series No. 861212, Sep. 1986, "The Design and Development of a Four Speed Powershift Transmission with Electronic Clutch Pressure Modulation", J. E. Goodbar an Michael D. Testerman.

*Primary Examiner*—Dirk Wright
*Assistant Examiner*—Khoi Q. Ta

[57] ABSTRACT

A system and method for controlling the clutches in a vehicle powershift transmission. The control system includes a microprocessor which periodically executes an algorithm and which has a memory in which is stored a sequential set of time reference values and a sequential set of pressure values. The control system applies to each oncoming element a fill pressure pulse for fill periods which are unique for each element. The control system determines shift time values, subsequent to filling of the control elements, as a function of the fill period. The control system applies pressure signals to the control elements at times represented by the shift time values which are unique for each element. The control system determines, subsequent to a realignment time, realignment shift time values which are the same for all of the control elements. The control system also applies pressure signals to the control elements subsequent to the realignment time, at times determined as a function of the realignment shift time values.

9 Claims, 14 Drawing Sheets

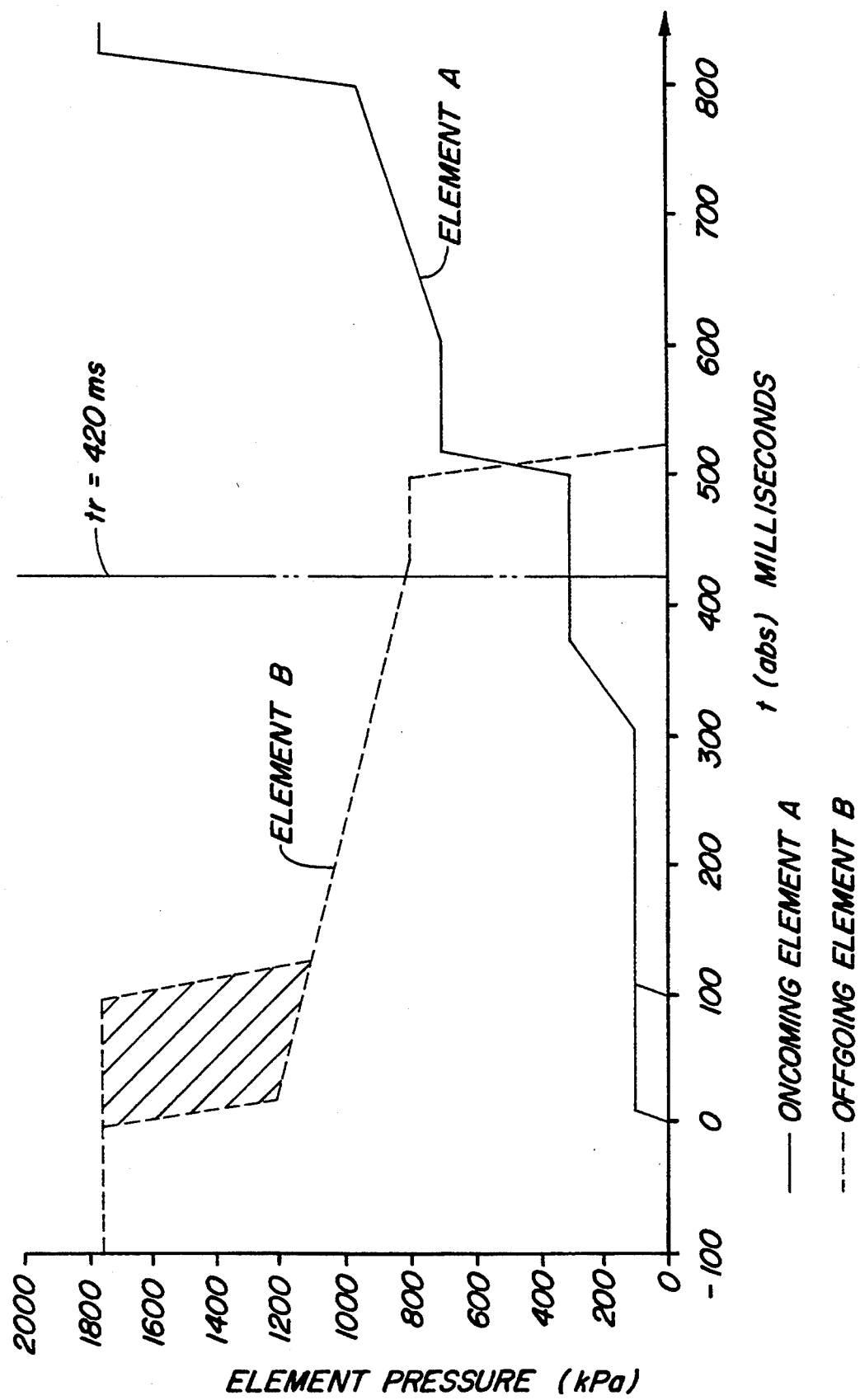

METHOD FOR CONTROLLING TRANSMISSION CONTROL CLUTCHES

BACKGROUND OF THE INVENTION

This application includes a microfiche appendix including 6 microfiche and 249 frames.

This invention relates to a vehicle transmission control system, in particular a microprocessor-based electronic control system for a powershift transmission having hydraulic pressure operated transmission control elements, such as brakes and clutches, and solenoid operated valves for controlling the hydraulic pressure delivered to the control elements, and more particularly to a system and method for controlling the electrical signals applied to the solenoid operated valves.

Some manufacturers have used versions of electrohydraulic transmission controls with some success. For example, a powershift transmission sold by Ford New Holland, Ltd. has two modulating valves which control three different transmission control clutches. These valves are in turn controlled by an electronic controller. Such a proportional control allows a clutch element to be modulated during engagement and release of that element, and the controller provides the ability to vary the modulation for a particular element for each unique shift. Another system which includes on-off valves and at least one proportional control valve is described in U.S. Pat. No. 4,855,913, issued 8 Aug. 1989 to Brekkestran et al.

In such systems each clutch may have a different fill volume and thus may require different fill times. U.S. Pat. No. 5,082,097, issued on 21 Jan. 1992 to Goeckner et al. relates to a transmission controller for a transmission which includes a solenoid valve operated clutch and a solenoid valve for operating the clutch. The Goeckner et al. system also discloses a calibrating system or a system for determining a current signal corresponding to the point at which the clutch begins to transmit torque. U.S. Pat. No. 5,224,577 assigned to the Assignee of this application (attorney file 14018-US), discloses methods for determining a fill pressure calibration value and a fill volume calibration value.

It would be desirable to control the timing of subsequent pressurization of such a clutch (after it is filled) with respect to the end of the time period required to fill the clutch. If this is done, and if the fill time is adjusted to compensate for various conditions, then the timing of subsequent pressurization of the clutch will also be adjusted to compensate for the conditions. It would also be desirable, at a point just prior to the time when torque transmission is transferred from one element to another at the end of a shift, to control all elements with the same time base so that such torque transfers can be precisely timed relative to each other.

SUMMARY OF THE INVENTION

An object of the present invention is to provide a method of controlling a powershift transmission wherein the timing of pressurization of a clutch, after it is filled, is controlled as a function of the time period required to fill the clutch.

Another object of the invention is to provide a such method wherein, at a point just prior to the time when torque transmission is transferred from one element to another at the end of a shift, to control all elements with the same time base so that such torque transfers can be precisely timed relative to each other.

These and other objects are achieved by the present invention for controlling the pressurization of clutches in a vehicle powershift transmission. The method includes storing in a memory a sequential set of time reference values and a sequential set of pressure command and slope values, and periodically executing an algorithm. Each pressure command value and slope value corresponds to one of the time reference values. An absolute time value is incremented every time the algorithm is executed. Prior to application to the control element of a fill pressure pulse, a shift time value is set equal to the absolute time value. In response to a wakeup command, oil flow is supplied to the clutch for a predetermined duration in order to fill the element. During this fill period a base pulse time value is periodically incremented, the absolute time value is periodically incremented and incrementing of the shift time value is prevented. When the base pulse time value is equal to a predetermined wakeup time value (meaning the clutch is filled), a wakeup flag is set, the absolute time value is incremented and the shift time value is set equal to the absolute time value plus a maximum time value less a fill duration time value. After the wakeup flag is set and the control element is filled, the absolute time value is incremented and compared to a realignment time value. If the absolute time value is less than the realignment time value, the shift time value is set equal to the absolute time value plus the maximum time value less the fill duration time value. If the absolute time value is not less than the realignment time value, the shift time value is set equal to the absolute time value plus the maximum time value. After each determination of the shift time value, the shift time value is compared to one of the stored time reference values and an appropriate one of the stored pressure command values and slope values is selected from memory and a pressure signal is applied to the control element. If the time shift value is not less than the time reference value, the time reference value is updated to the next sequential time reference value. After a realignment time, all elements are controlled as a function of an identical time value based on the absolute time value.

BRIEF DESCRIPTION OF THE DRAWINGS

FIG. 2b illustrates in greater detail a portion of the transmission of FIG. 2a.

FIG. 11 is a pressure versus time diagram which illustrates how the pressure applied to a transmission clutch element would vary as a function of time for the shift corresponding to the data shown in the Sample Shift Table.

DETAILED DESCRIPTION

Figure 1:
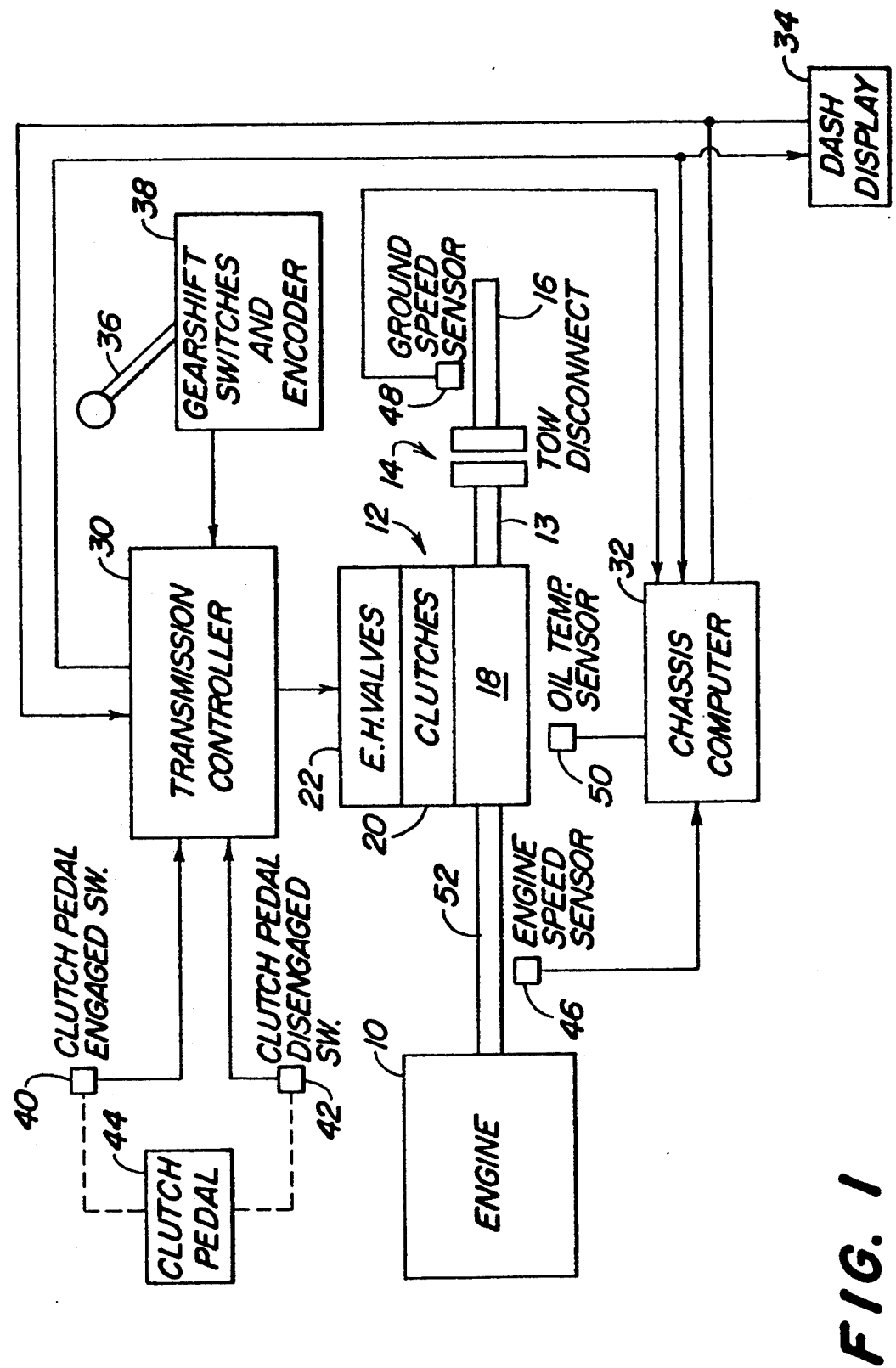
FIG. 1 is a schematic block diagram of a microprocessor-based transmission control system to which the present invention is applicable.

As shown in FIG. 1, a vehicle power train includes an engine 10 which drives a power shift transmission 12, which has an output shaft 13, which, via a conventional tow disconnect mechanism 14, drives an output drive shaft 16 which is connected to drive wheels (not shown). The power shift transmission 12 includes a transmission or gear box 18 which is operated by a set of pressure operated control elements or clutches 20 which are controlled by a corresponding set of solenoid operated control valves 22. The transmission 18 may be a transmission such as described in U.S. Pat. No. 5,011,465, issued 30 Apr. 1991 to Jeffries et al., and assigned to the assignee of this application.

The power shift transmission control system includes a transmission control unit 30, a chassis computer 32 and a dash display 34. The transmission control unit 30 and the chassis computer 32 are preferably microprocessor-based electronic control units. Manual control is achieved via a gearshift lever 36. A gearshift switches and encoder unit 38 provides signals representing the position of the lever 36 to the transmission control unit 30. A clutch engagement switch 40 and a clutch disengagement switch 42 provide signals representing the position of a clutch pedal 44. The chassis computer 32 receives signals from an engine speed sensor 46, a ground speed sensor 48 and a transmission oil temperature sensor 50. The chassis computer 32 sends information from these sensors to the transmission control unit 30.

The transmission control unit 30 includes a commercially available microprocessor (not shown) which executes a computer program which implements operation of the clutch control method described hereinafter. The transmission control unit 30 also includes valve drivers (not shown) which provide variable duty cycle pulse-width-modulated voltage control signals to the control valve units 22. The transmission control unit 30 and the valve drivers (not shown) will generate such control signals as a function of various sensed and operator determined inputs in order to achieve a desired pressure in the clutches 20 and to thereby control the shifting of the transmission 12 in a desired manner. The method of the present invention is implemented by the control unit 30 which executes the computer program which is listed in the microfiche appendix. The computer program listing is in Motorola 68HC11 assembly language.

Figure 2A:
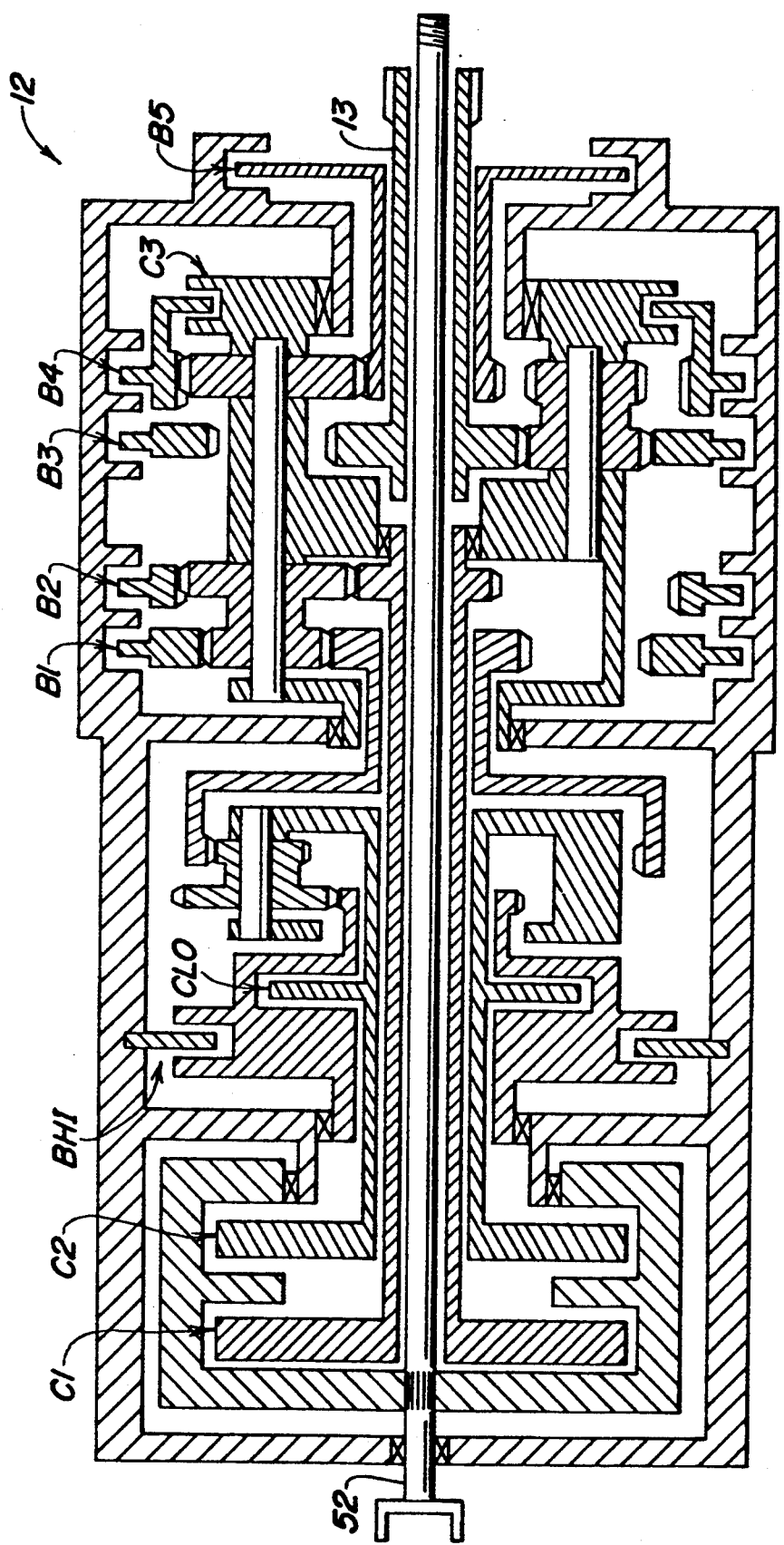
FIG. 2a is a schematic representation of a transmission to which the present invention is applicable.
Figure 2B:
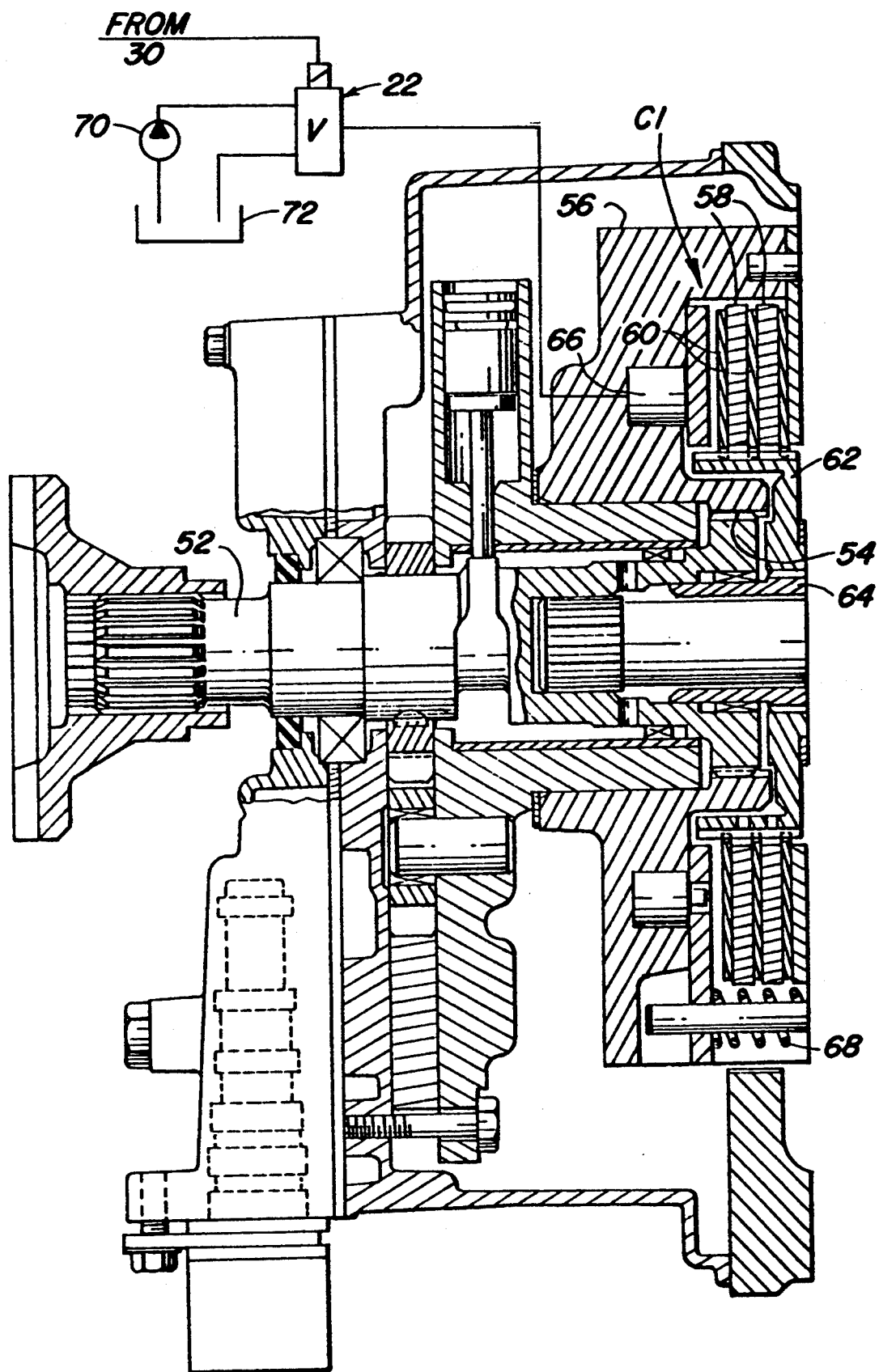

Referring to FIGS. 2a and 2b, the control elements of transmission 12 include a set of brake elements B1, B2, B3, B4 and B5, and a set of clutch elements C1, C2, C3, and CLO. The input shaft 52 is connected by splines 54 to the clutch drum 56 of clutch C1 and of clutch C2 (not shown in FIG. 2b). The drum 56 in turn is splined to the clutch separators 58 of clutch C1. The clutch disks 60 of clutch C1 are splined to the clutch hub 62 of clutch C1. The clutch hub 62 is splined to a first intermediate shaft 64. The first clutch Cl is provided with a piston 66 for activating the clutch C1 by compressing the clutch separators and disks 58, 60. A spring 68 is provided to bias clutch Cl out of engagement. For further information regarding the details of such a transmission reference is made to U.S. Pat. No. 5,011,465, which is incorporated by reference herein.

One of the control valves 22 associated with clutch C1 is schematically illustrated in FIG. 2b. The control valve 22 is connected to a pump 70 and to sump or reservoir 72 and controls pressurization of piston 66 in response to signals received from transmission control unit 30. Each of the brake and clutch elements is controlled by a similar corresponding control valve 22. Each of the control valves 22 is preferably a two-stage electrohydraulic valve such as a valve model No. 151140 manufactured by FEMA Corp. Such a valve has a main stage such as described in U.S. Pat. No. 4,741,364, issued 3 May 1988 to Stoss et al. and assigned to applicant's assignee.

The following description makes use of a number of symbols or acronyms which are defined as follows:

CLDspd is a speed threshold used when the clutch pedal is fully disengaged to determine if a "direct engagement" or a "rolling clutch disengaged" shift should occur.

Ne is engine speed.

Nemax is the maximum engine speed which can be used in the transfer curve equation.

Nemin is the minimum engine speed which can be used in the transfer curve equation.

P(f) is the shift table pressure value which is used to signal additional element fill or maximum pressure required.

P(w) is the shift table pressure value which is used to signal an element base wakeup pulse.

Pcd is the maximum pressure command used during a "rolling clutch disengaged shift".

Pch is the pressure command used for centrifugal head pressure adjustment.

PE(i) is the pressure value of a specific shift table entry.

Peol is the pressure value determined by using the shift table entries for pressure, slope, and time. , Pfill is the special value of Peol used during an element fill (this is larger than Pmax).

Pfill(el) is the fill pressure of an element as determined by the calibration procedure.

Pmax is the value of Peol which is the highest normal pressure command.

Poffset is a scaling value which allows Press(el) to be less than Pfill(el).

Press(el) is the pressure command for the element as determined by the Pressure Function subroutine.

Pwake is the special value of Peol used during an element base wakeup pulse.

SE(i) is the slope value of a specific shift table entry.

t(abs) is the timer value used to determine absolute time during a shift.

t(bp) is the timer value used to determine the time a base wakeup pulse has been in progress.

t(sft) is the time value used to retrieve proper data from the shift table.

tE(i) is the time value corresponding to a specific set of shift table data.

tfc is the time adjustment used for fill compensation.

To is the transmission oil temperature.

Tomax is the maximum oil temperature which can be used in the transfer curve equation.

Tomin is the minimum oil temperature which can be used in the transfer curve equation.

tr is the "realignment time", or the time value at which the shift is converted from relative to absolute time for all elements.

twake(el) is the time of the base wakeup pulse for an element as determined by the calibration procedure.

twake(max) is an arbitrary time used to keep negative numbers from occurring during calculations.

t1$a$ (or t1$b$) is an "intershift pause time" or time, between shifts.

Vbat is the input voltage to the controller.

Vmax is the maximum voltage which can be used in the transfer curve equation.

Vmin is the minimum voltage which can be used in the transfer curve equation.

Refering now to FIGS. 3–9, the algorithms and subroutines shown therein are executed once for each of the eight valves every 20 milliseconds, in the same order.

Figure 3:
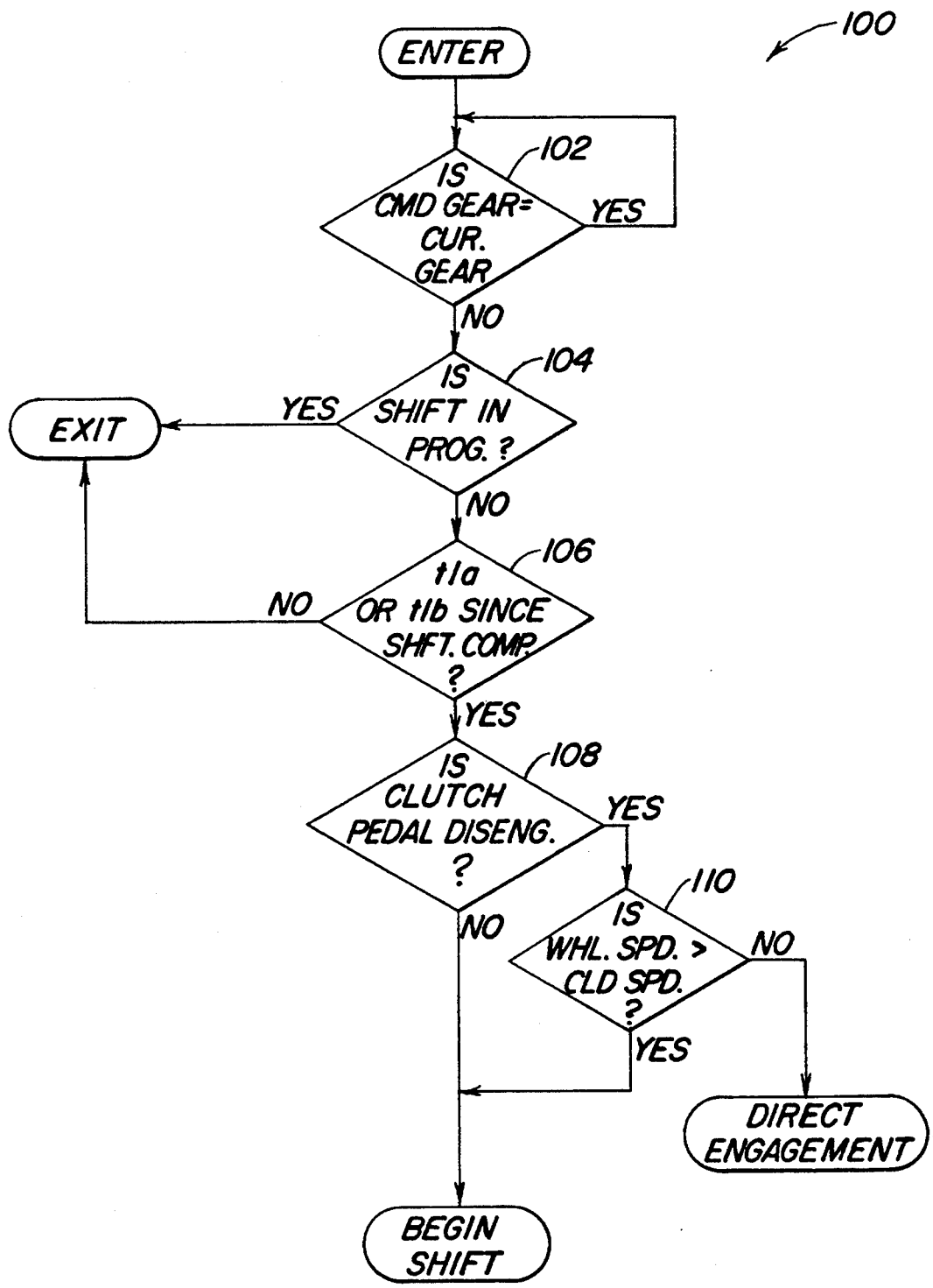
FIG. 3 is a simplified logic flow diagram of an algorithm which is performed by the method of the present invention and which determines if a shift is required.

FIG. 3 shows a test routine 100 which is executed to determine if a shift of the transmission 12 is required. This routine is a portion of an overall program which is constantly and repeatedly executed during normal operation. Step 102 tests if the commanded gear (determined by the position of the shift lever 36) is the same as current gear. If it isn't, then step 104 checks if a shift is in progress. If there isn't one in progress, then step 106 checks if the "intershift pause time" t1$a$ or t1$b$ has elapsed since the last shift. t1$a$ and t1$b$ are a pause times between shifts so that the timing of the shifts can be coordinated. It has been found there may be a problem if the shifts get crowded too close together. So, a pause time is used in between the shifts, and the pause time must elapse before another shift is performed. For this purpose, a timer is started after a shift is complete. There are two different intershift times depending on whether the tractor is in a working or transport gear. Additional intershift times could be created depending on the needs of the tractor.

The final check in step 108 is the position of clutch pedal 44. If the pedal 44 is not completely disengaged, a shift sequence is begun. If the pedal 44 is completely disengaged, the wheel speed of the vehicle is compared in step 110 to CLDspd. If wheel speed is greater than CLDspd, a shift sequence is begun. If the wheel speed is less than CLDspd, then the clutch elements which correspond to the commanded gear are engaged directly with no modulation. This is to remove delay when shifting while the vehicle is not moving, or moving very slowly (for example, when sitting at a stop sign). While the present invention is not directed to this test routine 100, it is included to show what leads up to the starting a shift.

Figure 4:
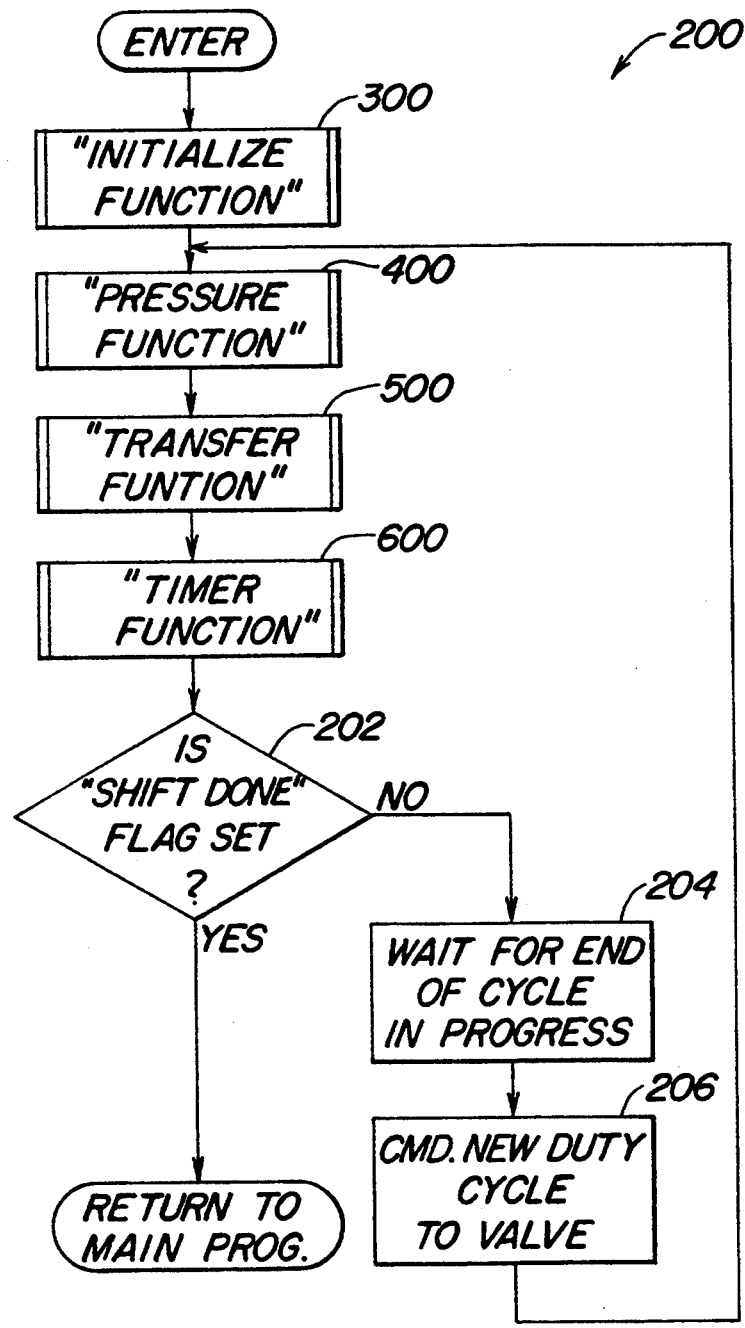
FIG. 4 is a simplified logic flow diagrams of a main loop algorithm which is performed by the method of the present invention.

Turning now to FIG. 4, there is shown the main shift control loop or process 200 which is performed for each element during a shift. First, an "Initialize Function" 300 is performed for each element at the beginning of a shift. At 400 a "Pressure Function" is executed to determine the pressure command which represents the pressure which is to be applied to the particular clutch. This is followed by a "Transfer Function" 500 which determines the electrical duty cycle which, if applied to the appropriate valve, will produce the pressure determined by the "Pressure Function". Next, the "Time Function" 600 determines or controls the increment of timers to control the timing of events during a shift. Then step 202 causes exiting of the main shift control loop if a "shift done" flag is set. Otherwise, control is directed to steps 204 and 206 which commands a new duty cycle to one of the valves 22 at the appropriate time.

Figure 5:
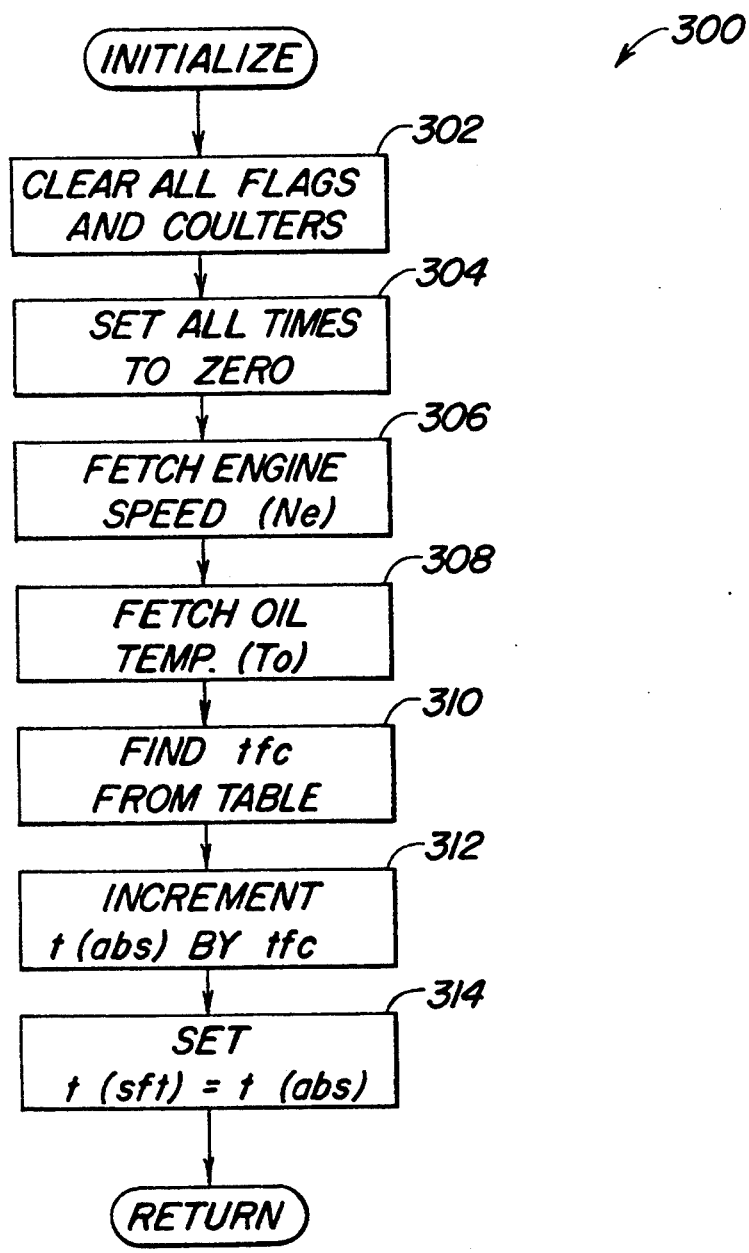
FIG. 5 is a simplified logic flow diagram of an initialization algorithm which is performed by the main loop algorithm of the present invention.

The "Initialize Function" 300 is more fully illustrated in FIG. 5. Basically, in steps 302–314 all the counters, flags, and timer values are initialized for the shift. In steps 306–310 sensed engine speed and oil temperature values are read, and these values are used with an oil temperature/engine speed compensation table (not shown) stored in memory to determine "t(fc)" values. The "t(fc)" value represents the number of 20 millisecond steps by which an absolute timer is incremented. Step 306–312 can be described as "fill pulse" compensation whereby the filling duration of clutch elements is adjusted to compensate for variations in engine speed and oil temperature. This is represented in the timing diagram of FIG. 11 by the duration labeled "t(fc)" between 0 and 100 milliseconds. In a typical shift the oncoming elements are commanded on or pressurized by a variable duration fill pulse to assure complete filling .of the element being filled. The timing of the beginning of a shift may be advanced by up to five (100 msec) time intervals, depending on oil flow (engine speed) and oil viscosity (oil temperature). This adjusts the timing of oncoming elements to compensate for slower valve response with cold oil and slower fills with lower pump flow during the important fill period at the beginning of a shift. Off-going and non-changing elements are adjusted the same time amount, but this has no overall effect on them.

Turning now to FIGS. 6$a$ and 6$b$, the "Pressure Function" 400 determines a pressure command value Press(el) which used later by the "Transfer Function" 500. The "Pressure Function" in step 402 sets Press(el) equal to a Pfill(el) value which is determined by a calibration procedure such as described in U.S. patent application Ser. No. 910,818, filed 9 Jul. 1992 and assigned to the assignee of the present application. Then in step 404 an offset value "Poffset" is subtracted from Press(el) so that no negative numbers have to be manipulated.

Next, a "Find Peol" subroutine, (described later with reference to FIG. 7) is executed to retrieve pressure and slope values from data stored in a shift table in memory, and calculate a pressure value Peol therefrom. The algorithm then returns to the Pressure Function of FIG. 6$a$ where steps 406 and 408 set Press(el) to zero if Peol is equal to zero. Steps 410 and 412 set Press(el) to a maximum pressure command value, Pfill, if Peol is equal to P(f) for times when extra fill oil is needed on oncoming elements, or when maximum pressure is desired. Steps 414 and 416 set Press(el) to Pwake if Peol is equal to P(w). Pwake is a special value which is used to signal the start of a "wakeup" pulse, which is the initial pressurization period of an oncoming element, and which is an identifier which is used by the Time Function of FIG. 9 to start incrementing a base pulse timer value t(bp).

If Peol is not one of these three special cases, then step 418 adds Peol to Press(el). Then step 420 determines if the element requires centrifugal head compensation. If it is, then steps 422-426 reads the engine speed, determines the appropriate pressure value Pch from a table that is stored in memory, and adds Pch to Press(el). In this manner, steps 420-426 add to Press(el) a centrifugal head compensation factor. The centrifugal head compensation process is more fully described in the aforementioned U.S. patent application Ser. No. 07/910,818.

Steps 428 and 430 operate to limit Press(el) to a maximum pressure Pmax in order to prevent overflow during later calculations. Pmax is a maximum valve duty cycle value, but is smaller than Pfill and Pwake, so the controller can distinguish between them in later calculations. Next, step 432 exits this subroutine if the clutch is engaged. Otherwise, this subroutine proceeds to steps 434 and 436 which limit Press(el) to a pressure value Pcd, if the tractor is moving and the clutch is disengaged. This allows the transmission elements to slip and reduce engagement shock due to the inertia of the transmission 18 being transmitted to the rear axle (not shown) because in this drive train the clutches are located at the front of the transmission 18 next to the engine 10. Note that the P(f) and P(w) values are not affected by this, so the oncomimg elements still fill correctly. In this manner the "Pressure Function" 400 determines the pressure command value Press(el).

Figure 8A:
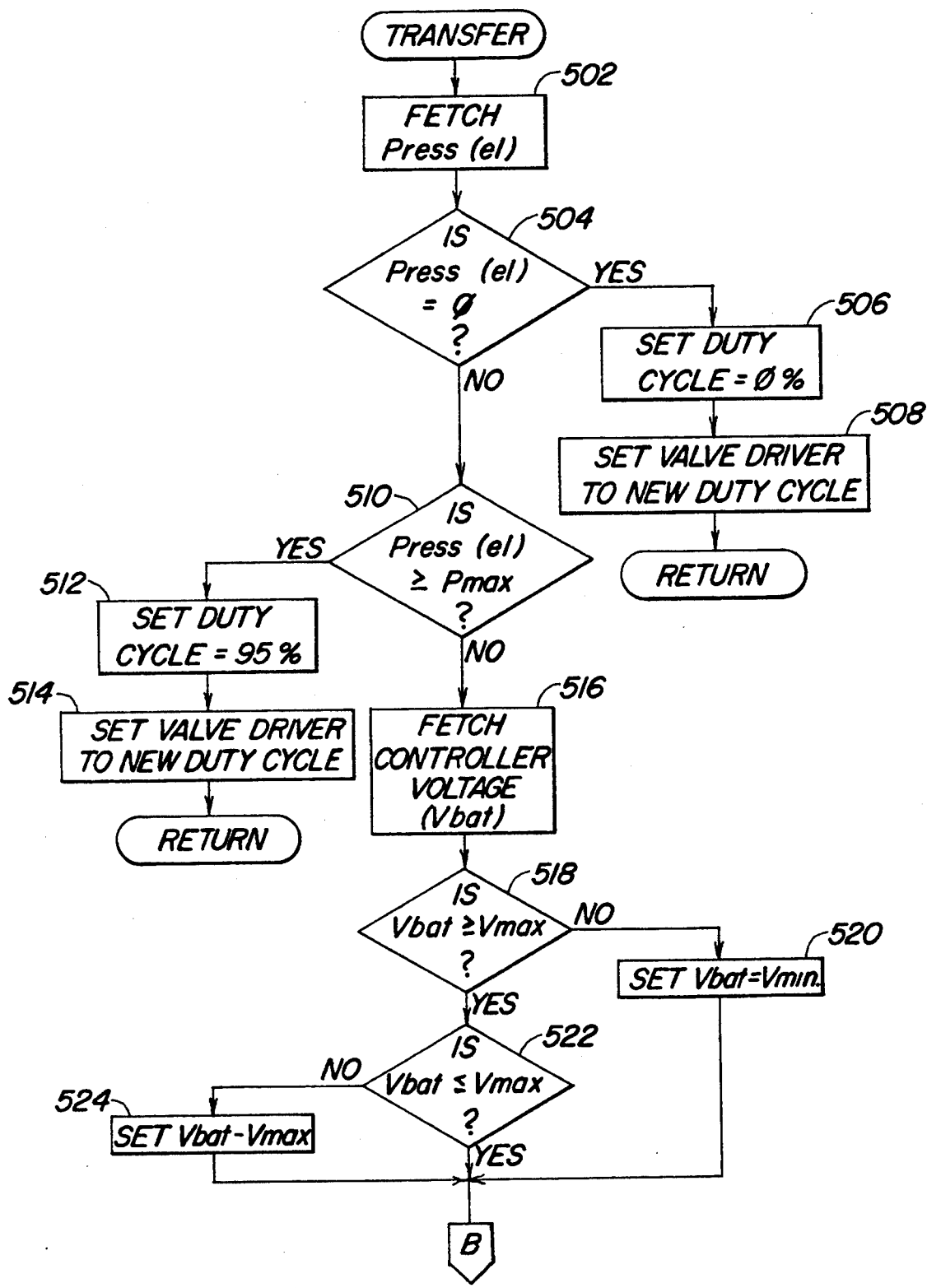
FIGS. 8a and 8b form a simplified logic flow diagram of a transfer funtion algorithm which determines a duty cycle for a valve command signal from the Press(el) values provided by the algorithm of FIGS. 6a and 6b.
Figure 8B:
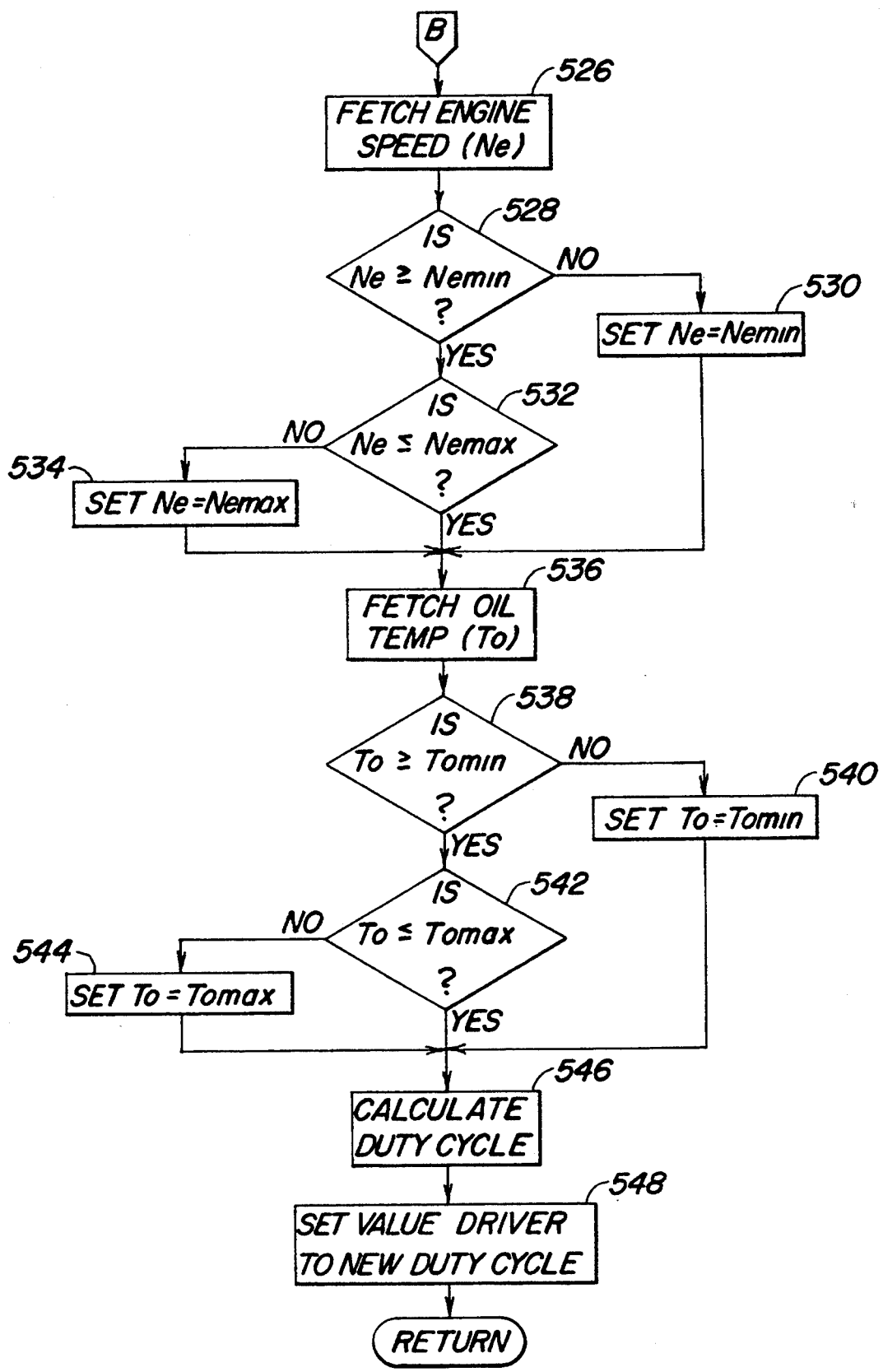

FIGS. 8a and 8b illustrate the "Transfer Function" 500. The output pressure of the electro-hydraulic valves 22 may be described as a linear function of electrical duty cycle. Ideally, this function can be described by a linear equation of the form $Y = mX + b$ where Y = Valve command, X = Press(el), m is a slope term, and b is an offset term. The "Transfer Function" 500 begins at step 502 which fetches the Press(el) value. Steps 504-508 set the duty cycle value to zero and applies this duty cycle value to the valve driver (not shown) for the approriate one of valves 22 if Press(el) equals zero. Steps 510-514 set the duty cycle value to 95% and applies this duty cycle value to the valve driver (not shown) for the approriate one of valves 22 if Press(el) is greater than or equal to Pmax. This turns the valve driver fully on and causes the valve 22 to provide the maximum possible pressure.

Steps 516-524 check a battery voltage value, Vbat, and limit Vbat between minimum and maximum values. Steps 526-534 check the engine speed value, Ne, and limit Ne between minimum and maximum values. Steps 536-544 check the oil temperature value, To, and limit To between minimum and maximum values.

Next step 546 calculates the duty cycle value, Valve Cmd(%) according to the following equation:

$$\text{Valve } Cmd(\%) = [Int + K_1(Vbat) + K_2(Ne) + K_3(To)] + [Slope + K_4(Vbat) + K_5(Ne) + K_6(To)][Press(el)],$$

where Int is the intercept of a non-corrected transfer curve, where Slope is the slope of a non-corrected transfer curve, and K1-K6 are empirically determined constants. The result from step 546 is a valve command which is adjusted or compensated as a function of variations in battery voltage, engine speed and oil temperature. Step 548 applies this valve command to the appropriate valve driver.

While this equation is linear for a given set of input conditions, the real world provides too many variations. Experimentation has determined that, for the particular valves used in this system, the only two factors found to be significant are changes in input voltage and pressure to the valve. While valve voltage can be measured directly, the change in input pressure is determined by watching oil temperature and engine speed (if a reliable, low cost pressure transducer was available, this could be measured directly).

To prevent a faulty instrumentation reading from giving an unsuitable result, maximum and minimum values are set for each of the inputs. If there are any other inputs which the valve responds to, these additional factors could be added to the equation.

Figure 7:
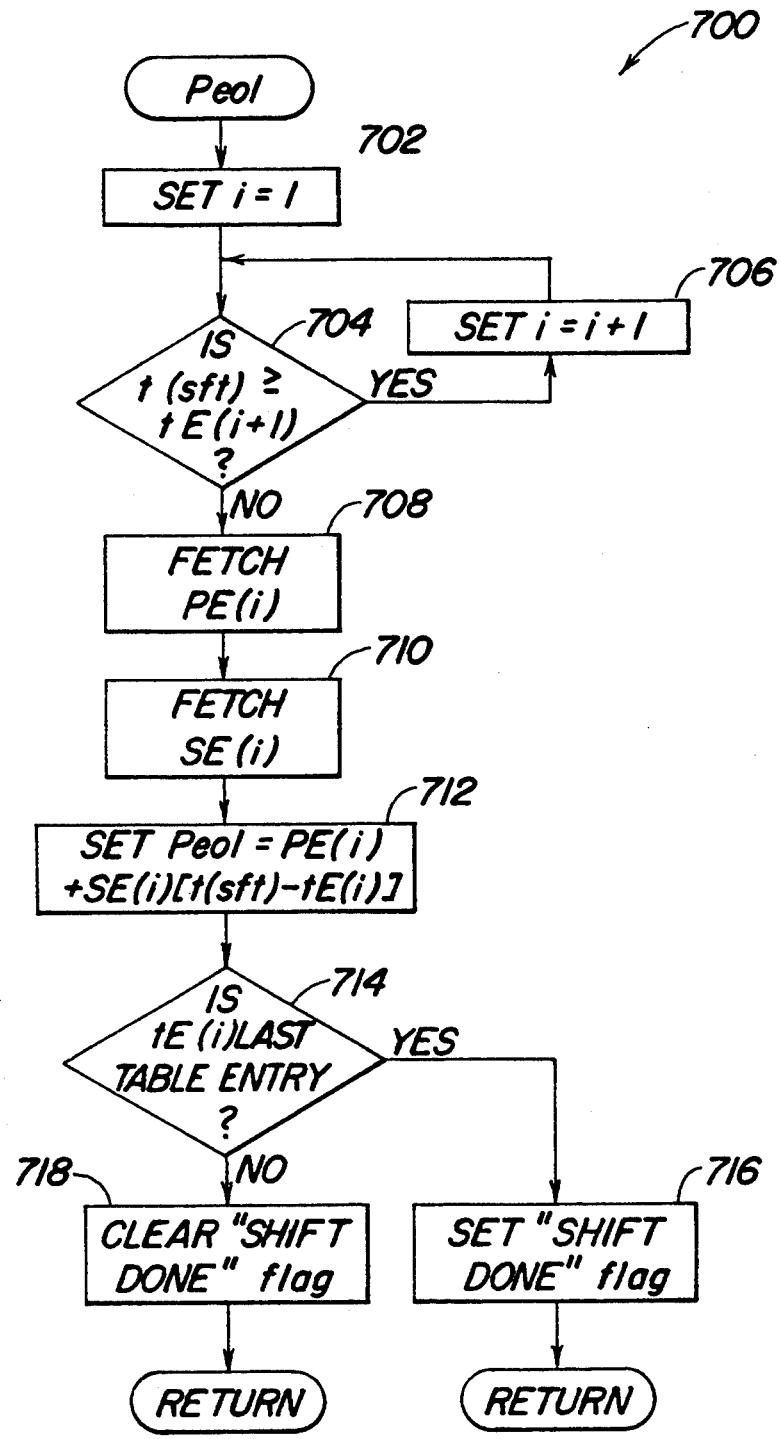
FIG. 7 is a simplified logic flow diagram of an algorithm which determines the pressure value Peol from stored pressure values PE(i) which are stored in a table in memory.
Figure 9:
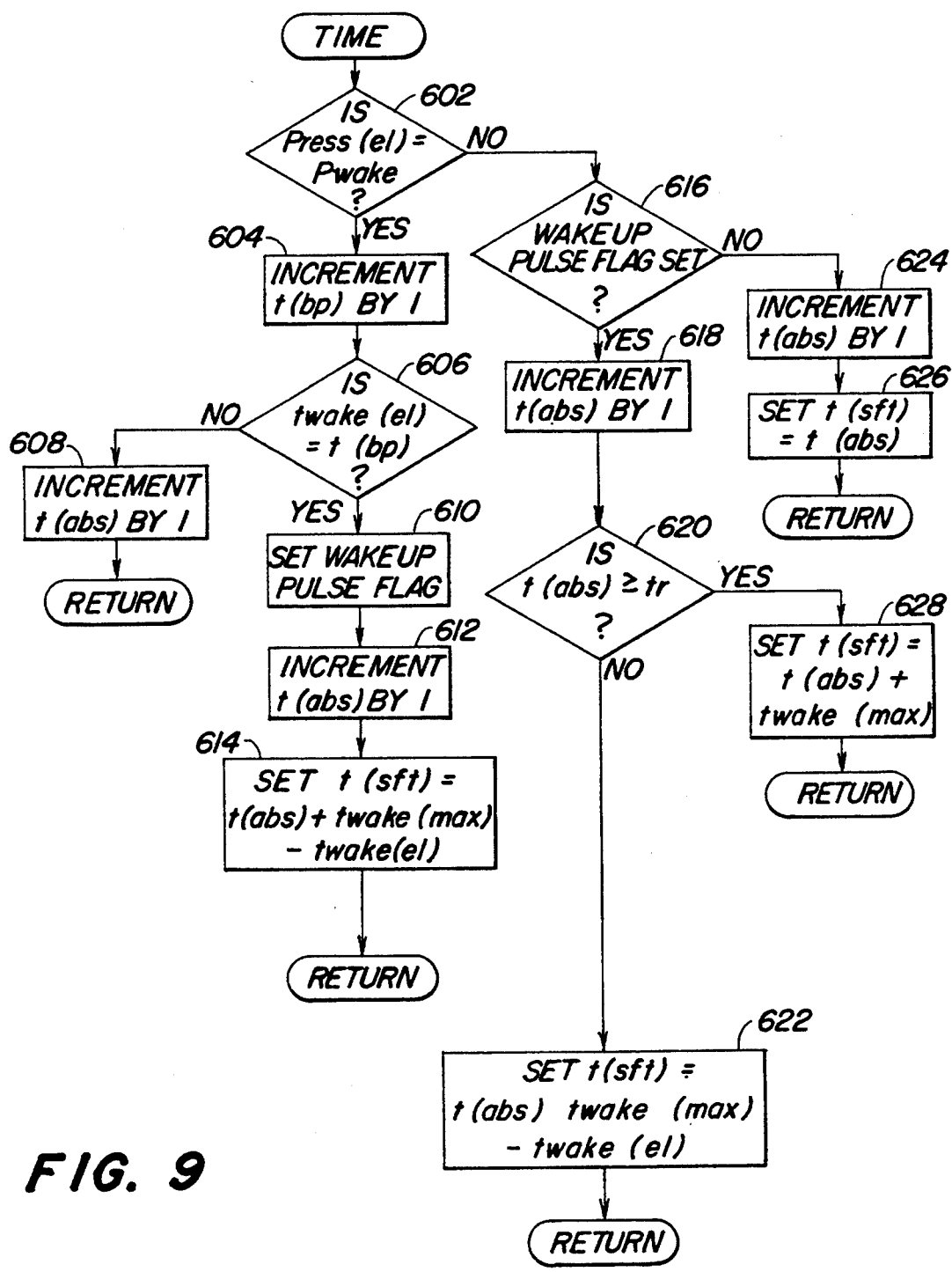
FIG. 9 is a simplified logic flow diagram of a Time Function algorithm which determines the times at which various pressures are applied to the control valves 22.

The following descriptions of FIGS. 7 and 9 are best understood in relation to the following Sample Shift Table which is an example of data which is stored in memory and which is utilized by the algorithms in connection with a particular shift. In this sample table element A is an oncoming element and element B is an off-going element. It should be understood that other shifts would have different shift tables. It should also be understood that more than one pair of elements can be changed during a shift. The slope SE(i) is expressed as the amount of pressure change per time interval, and the pressure PE(i) is the relative pressure (to the fill pressure) desired at that point, plus an offset pressure Poffset.

| | SAMPLE SHIFT TABLE | | | | | |
| | Element A | | | Element B | | |
| i | tE (i) (msec) | SE (i) (kP/20 ms) | PE (i) (kP) | tE (i) (msec) | SE (i) (kP/20 ms) | PE (i) (kP) |
|---|---|---|---|---|---|---|
| 1 | 0 | 0 | 1593 | 0 | −30 | 1100 |
| 2 | 100 | 0 | 1680 | 400 | 0 | 500 |
| 3 | 600 | 0 | 0 | 500 | 0 | 0 |
| 4 | 620 | 0 | 160 | | | |
| 5 | 920 | 0 | 160 | | | |
| 6 | 940 | 0 | 600 | | | |
| 7 | 1040 | 20 | 600 | | | |
| 8 | 1300 | 0 | 1593 | | | |

Figure 6A:
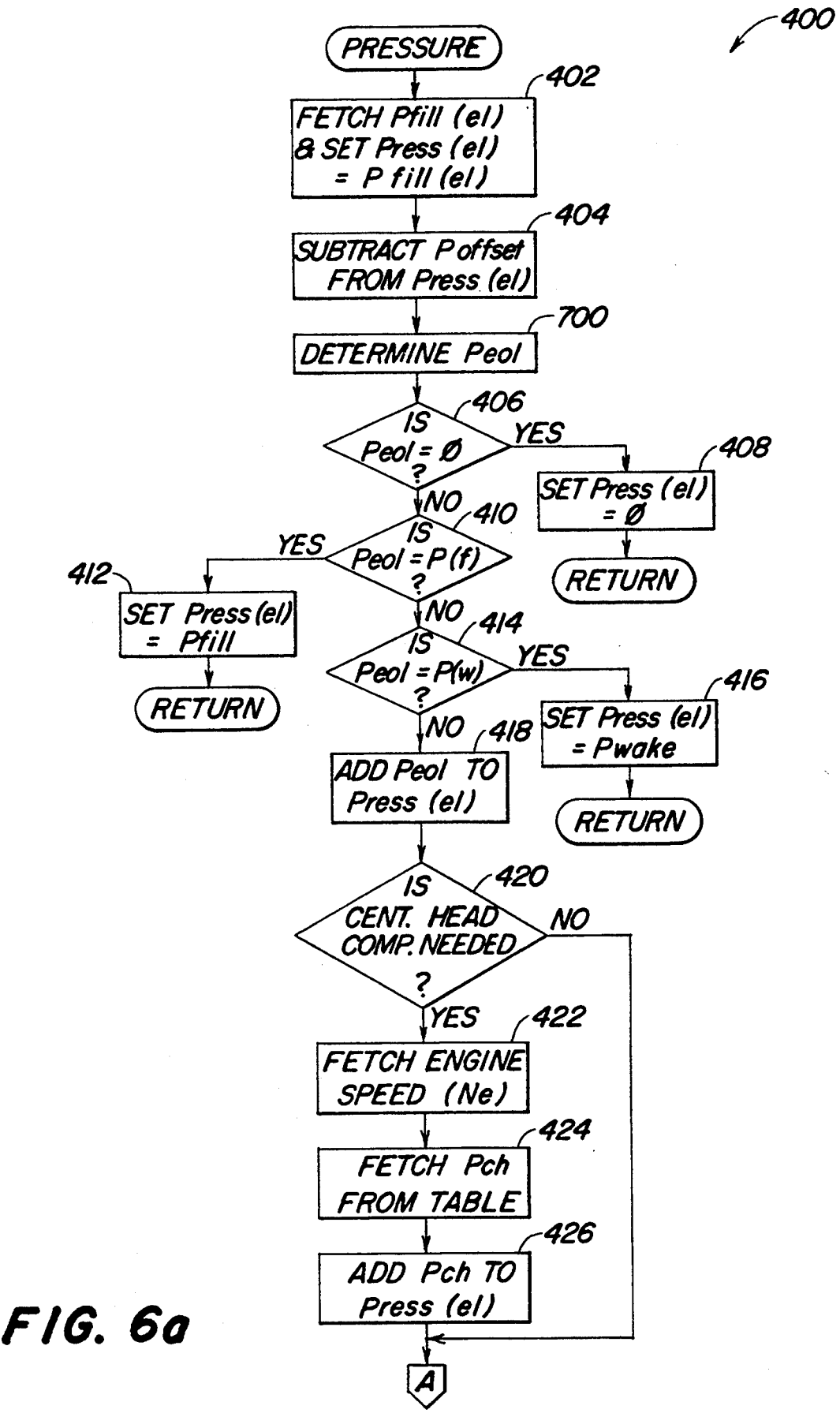
FIGS. 6a and 6b form a simplified logic flow diagram of a pressure funtion algorithm which determines an element pressure value Press(el) from pressure values Peol provided by the algorithm illustrated by FIG. 7.
Figure 6B:
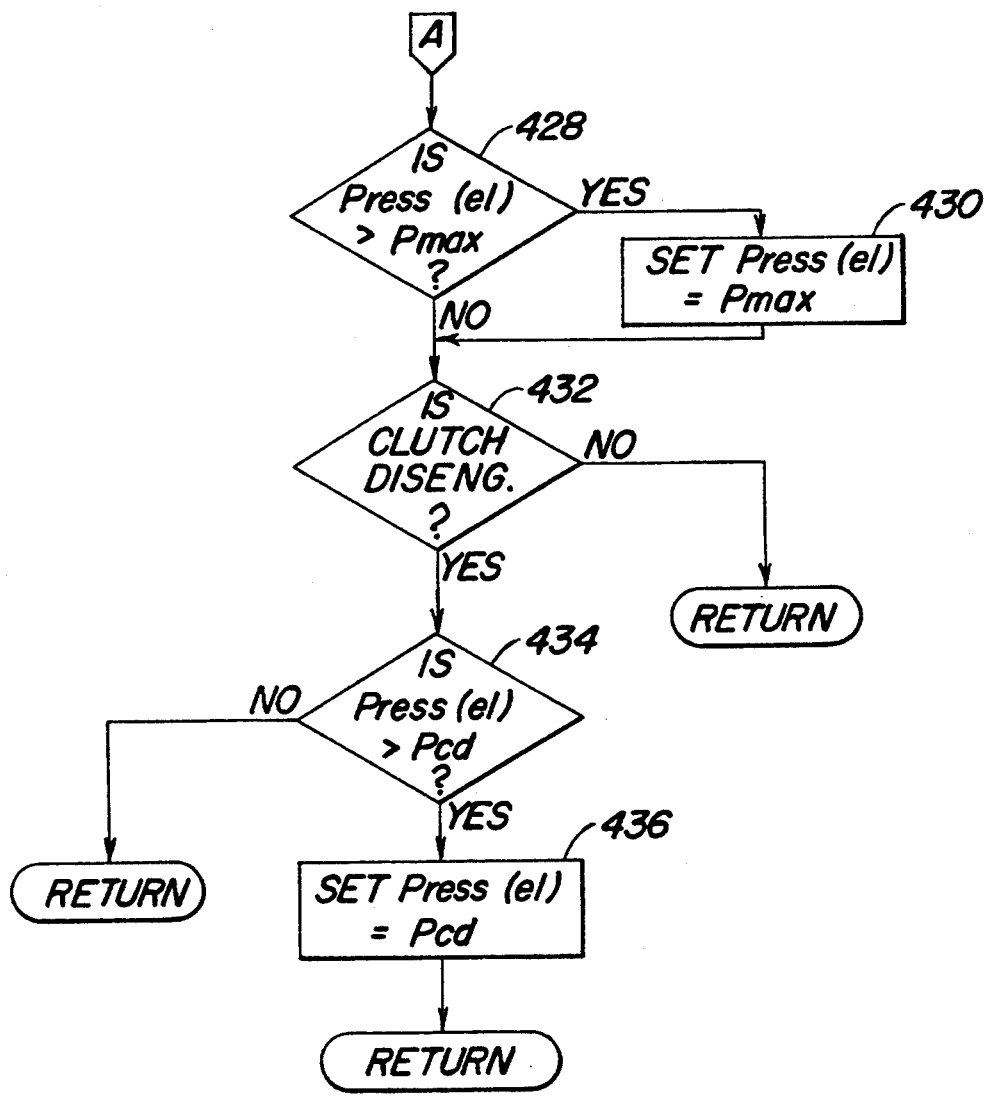

Refering now to FIG. 7, the "Find Peol" subroutine 700 retrieves from the shift table the appropriate pressure and slope values, PE(i) and SE(i), and calculates the value of Peol which is supplied to the Pressure Function 400 of FIGS. 6a and 6b. First, step 702 sets an index i equal to 1. Then step 704 compares a shift timer value t(sft) (supplied by the Time Function described later with reference to FIG. 9) to the next stored timer value tE(i+1). If t(sft) is less than tE(i+1), then steps 706-712 fetch the PE(i) and SE(i) values from the shift table and calculates the Peol value from the equation: Peol = PE(i) + SE(i) × [t(sft) − tE(i)].

Steps 714 and 718 clear a "shift done" flag if tE(i) is not the last entry in the table and returns control to step 406 of the Pressure Function of FIG. 6a. Steps 714 and 716 sets the "shift done" flag if tE(i) is the last entry in the table and returns control to step 406 of the Pressure Function of FIG. 6a. Thus, as long as t(sft) is less than tE(i+1) the Find Peol subroutine will fetch the pressure and slope values corresponding to tE(i) from the shift table. If t(sft) is not less than tE(i+1), then step 704 directs the subroutine to step 706 which increments the index i by 1 and returns control to step 704. Steps 704–712 will then fetch the pressure and slope values from the next row of the shift table.

Reference is now made to the Time Function 600 illustrated by FIG. 9. The Time Function generates the shift timer values t(sft) which are used by the Find Peol subroutine to extract data from the shift table. If no shift is being commanded and the Wakeup pulse flag has not been set, then steps 602, 616, 624 and 626 merely increment the absolute timer value t(abs) by 1, sets a shift timer value t(sft) equal to t(abs) and returns this t(sft) value for use by next operation of the Find Peol subroutine.

If in step 602 Press(el) is equal to Pwake (the special value indicative of a "wakeup" pressure pulse), then the algorithm proceeds to step 604 which increments a base pulse timer value t(bp) by 1. Then, step 606 compares t(bp) to twake(el), which is a timer value corresponding to the time at which a wakeup pulse is to be ended. Before this time has occured, t(bp) will not be equal to twake(el) and step 606 directs control to step 608 which increments the absolute timer value t(abs) by 1. The shift timer value t(sft) remains unchanged and this unchanged t(sft) value is returned for use by next operation of the Find Peol subroutine. The algorithm will continue to loop through steps 602–608 until the time the wakeup pulse is to be ended.

At the time the wakeup pulse is to be ended t(bp) will be equal to twake(el) and step 606 directs control to step 610 which sets a wakeup pulse flag, to step 612 which increments the base pulse timer value t(bp) by 1, and to step 614 which calculates the shift timer value t(sft) according to the equation:

$$t(sft) = t(abs) + twake(max) - twake(el),$$

where twake(max) is another arbitrary number which is added so that all of the numbers will be positive and twake(el) is the duration of the wakeup pulse for a particular one of the eight shift elements being applied.

Since the wakeup pulse has ended, Press(el) will no longer equal Pwake. Thus, the next time the Time Function is executed, step 602 will direct control to step 616, and step 616 will direct control to step 618 because the wakeup pulse flag has been set. Step 618 increments the timer value t(abs) by 1. Step 620 compares t(abs) to a "realignment time" value tr. If t(abs) is less than the "realignment time" value tr, then step 622 sets t(sft) equal to [t(abs)+twake (max)−twake (el)] and returns this t(sft) value for use by next operation of the Find Peol subroutine. Thus, in the interval between the end of the wakeup pulse and a "realignment time", the shift timer value t(sft) will be a function of twake(el), which may be different for each particular element or clutch being controlled.

When the realignment time occurs, for example at t(abs) equal to 420 milliseconds, step 620 will thereafter direct control to step 628. Step 628 sets t(sft) equal to [t(abs)+twake(max)] and returns this t(sft) value for use by next operation of the Find Peol subroutine. Thus, after the "realignment time" the shift timer value t(sft) will be independent of twake(el) and will be the same for all elements. Such shift time values after the "realignment time" may be referred to as "realignment shift time values". It should be noted that t(sft) is the same for oncoming and offgoing elements even though the oncoming is t(abs)+twake(max) and the offgoing is just t(abs). This is because the time values are adjusted in the shift tables. As a result, after the "realignment time" the timing of all elements will be a function an identical shift timer value t(sft). This permits precise timing of each on-coming element relative to the other elements before the shift reaches the critical point where one element is turned off and stops transmitting torque and another element is turned on and begins transmitting torque (element swapping).

To summarize, the absolute time value t(abs) is incremented every time the algorithm is executed. Prior to application to the control element of a fill pressure pulse, a shift time value t(sft) is set equal to the absolute time value t(abs).

In response to a wakeup command, pressure is applied to the clutch for a predetermined duration, represented by twake(el), in order to fill the element. During this fill period a base pulse time value t(bp) and the absolute time value t(abs) are periodically incremented. However, during this fill period the shift time value t(sft) is not incremented.

When the base pulse time value is equal to a predetermined wakeup time value (meaning the clutch is filled), the wakeup flag is set, the absolute time value t(abs) is incremented and the shift time value t(sft) is set equal to the absolute time value plus a maximum time value less the fill duration time value twake(el). After the wakeup flag is set and the control element is filled, the absolute time value is incremented and compared to a realignment time value tr. If the absolute time value t(abs) is less than the realignment time value tr, the shift time value t(sft) is set equal to the absolute time value t(abs) plus the maximum time value less the fill duration time value twake(el).

A key aspect of the present invention is that, since twake(el) will be different for each element, therefore, after an element has been filled, and before the realignment time, the shift time value t(sft) resulting from step 622 will be different for each oncoming element. As a result, the timing of pressurization events during this period will be unique and individual for each different element or clutch 20 of the transmission 18, and will be a function of the twake(el) value for that particular element.

If, in step 620, the absolute time value t(abs) is not less than the realignment time value tr, it means that the realignment time has been reached, and the shift time value t(sft) is set equal to the absolute time value t(abs) plus the maximum time value. As a result, after the realignment time has been reached, all pressurization events will be controlled by the same identical time value, namely [t(abs)+twake(max)]. This permits precise synchonization of pressure control after the realignment time.

After each determination of the shift time value, the shift time value is compared to one of the stored time reference values and an appropriate one of the stored pressure command values and slope values is selected from memory and a pressure signal is applied to the control element. If the time shift value is not less than the time reference value, the time reference value is updated to the next sequential time reference value. After a realignment time, all elements are controlled as a function of an identical time value based on the absolute time value.

Figure 10:
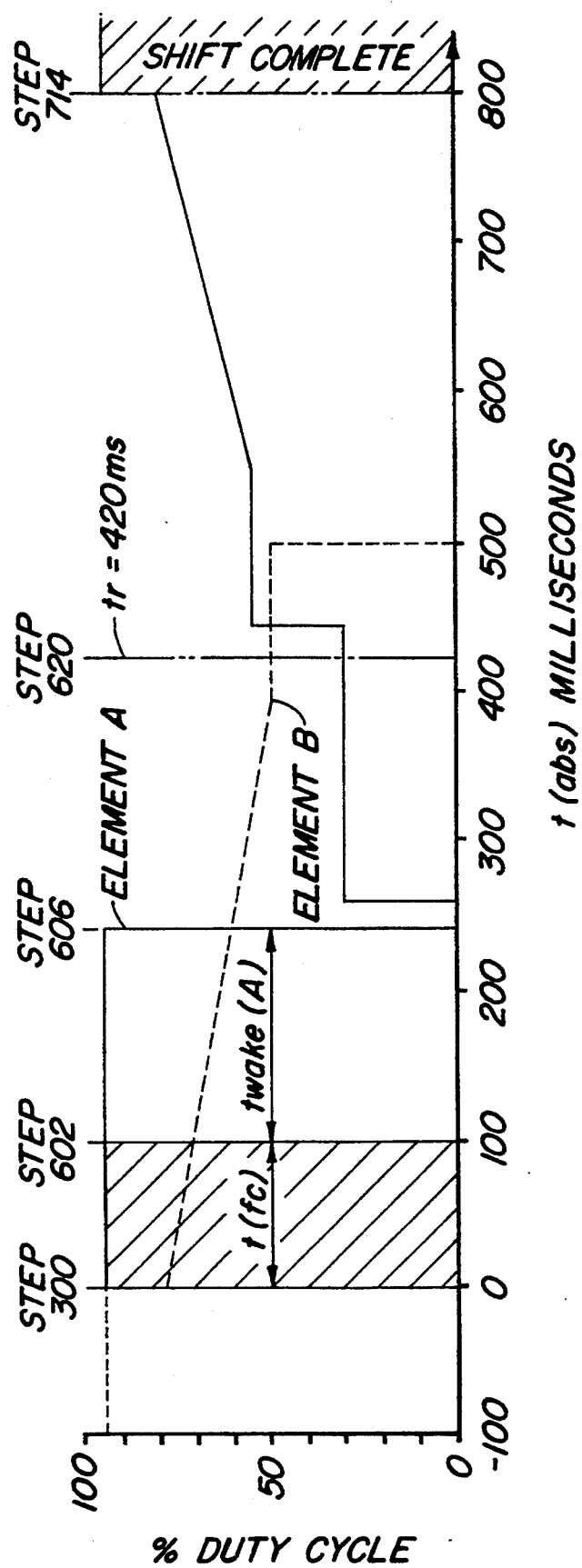
FIG. 10 is a signal versus time diagram which illustrates how the duty cycle value would vary as a function of time for the shift corresponding to the data shown in a Sample Shift Table.

Refering now to FIGS. 10 and 11, the signal versus time diagrams therein illustrates how the duty cycle values and element pressures would vary as a function of time for the shift corresponding to the data shown in a Sample Shift Table. The duty cycle value and pressure for the on-coming element or clutch, element A, are indicated by the solid lines and the duty cycle value and pressure for the off-going element or clutch, element B, are indicated by the dashed lines. The cross-hatched area between t(abs)=0 and 100 milliseconds corresponds to the variable portion of the fill time as determined by the fill compensation value t(fc) derived by the Initialize Function 300 of FIG. 5. The remaining duration of the fill time (to approximately 240 milliseconds) is determined by the twake(el) calibration value which is unique for each element. The duration of the 0% duty cycle value beginning at t(abs)=240, and the timing of pressurization of element A at t(abs)=260 milliseconds is a function of twake(el) and is therefore unique for element A. After the realignment time, at t(abs)=420, timing of both elements A and B is controlled as a function of identical time values based on t(abs). This permits precise relative timing of the transfer of torque carrying from element B to element A during the period from t(abs)=about 450 milliseconds to completion of the shift at t(abs)=about 800 milliseconds.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle powershift transmission having a plurality of hydraulic pressure operated control elements for shifting the transmission, a control system for controlling pressurization of the control elements, the control system comprising:

means for applying to each oncoming element a fill pressure pulse for fill periods which are unique for each element;

means for determining shift time values, subsequent to filling of the control elements, as a function of the fill period;

means for applying pressure signals to the control elements at times represented by the shift time values, wherein the shift time values for each element are unique;

means for determining, subsequent to a realignment time, realignment shift time values which are the same for all of the control elements; and means for applying pressure signals to the control elements subsequent to the realignment time, at times determined as a function of the realignment shift time values.

2. The control system of claim 1, further comprising:

a memory for storing a sequential set of time reference values and a sequential set of pressure command values, each pressure command value corresponding to one of the time reference values;

means for comparing the shift time values to one of the stored reference time values and selecting one of the stored pressure command values as a function of said comparison; and means for applying to the control elements pressure signals corresponding to the selected pressure command values.

3. The control system of claim 2, further comprising:

means for updating the selected time reference value to a next sequential time reference value if the time shift-value is not less than the one time reference value.

4. The control system of claim 1, further comprising:

a memory for storing a sequential set of time reference values, a sequential set of pressure command values and a sequential set of pressure slope values, each pressure command value and pressure slope value corresponding to one of the time reference values; and means for applying to the control element a pressure corresponding to a selected one of the pressure command values plus the product of a selected one of the slope values multiplied by a time interval value.

5. In a vehicle powershift transmission having a hydraulic pressure operated control element for shifting the transmission, a microprocessor-based system for controlling pressurization of the control element, the system comprising:

a memory having stored therein a sequential set of time reference values and a sequential set of pressure command values, each pressure command value corresponding to one of the time reference values;

means for, prior to application to the control element of a fill pressure pulse, periodically incrementing an absolute time value and setting a shift time value equal to the absolute time value;

means for generating a wakeup command;

means for, in response to the wakeup command, periodically incrementing a base pulse time value, periodically incrementing the absolute time value and preventing incrementing of the shift time value;

means for, when the base pulse time value is equal to a predetermined wakeup time value, setting a wakeup flag, incrementing the absolute time value and setting the shift time value equal to the absolute time value plus a maximum time value less a fill duration time value;

means for, after the wakeup flag is set and the control element is filled, incrementing the absolute time value, comparing the absolute time value to a realignment time value, and if the absolute time value is less than the realignment time value, setting the shift time value equal to the absolute time value plus the maximum time value less the fill duration time value, and if the absolute time value is not less than the realignment time value, setting the shift time value equal to the absolute time value plus the maximum time value;

means for comparing the shift time values to one of the time reference values and selecting one of the stored pressure command values from memory; and means for applying to the control element a pressure corresponding to the selected pressure command value.

6. In a vehicle powershift transmission having a hydraulic pressure operated control element for shifting the transmission, a method of controlling pressurization of the control element, the method comprising:

a) generating a wakeup command;
b) applying a fill pressure pulse to the control element;
c) filling the control element with hydraulic fluid;
d) storing in a memory a sequential set of time reference values and a sequential set of pressure command values, each pressure command value corresponding to one of the time reference values;
e) prior to application to the control element of a fill pressure pulse, periodically incrementing an absolute time value and setting a shift time value equal to the absolute time value;
f) in response to the wakeup command, periodically incrementing a base pulse time value, periodically incrementing the absolute time value and preventing incrementing of the shift time value;
g) when the base pulse time value is equal to a predetermined wakeup time value, setting a wakeup flag, incrementing the absolute time value and setting the shift time value equal to the absolute time value plus a maximum time value less a fill duration time value;
h) after the wakeup flag is set and the control element is filled, incrementing the absolute time value, comparing the absolute time value to a realignment time value, and if the absolute time value is less than the realignment time value setting the shift time value equal to the absolute time value plus the maximum time value less the fill duration time value, and if the absolute time value is not less than the realignment time value setting the shift time value equal to the absolute time value plus the maximum time value; and
i) after each of the steps e), f), and g), comparing the shift time values to one of the time reference values and selecting one of the stored pressure command values from memory, and applying to the control element a pressure corresponding to the selected pressure command value.

7. The method of claim 6, further comprising:
updating the time reference value to the next sequential time reference value if the time shift value is not less than the time reference value.

8. The method of claim 6, further comprising:
storing in the memory a sequential set of pressure slope values, each pressure slope value corresponding to one of the time reference values; and
applying to the control element a pressure corresponding to the selected pressure command value plus the product of the slope value multiplied by a time interval value.

9. In a vehicle powershift transmission having a hydraulic pressure operated control element for shifting the transmission, a method of controlling pressurization of the control element, the method comprising:
generating a wakeup command;
applying a fill pressure pulse to the control element;
filling the control element with hydraulic fluid;
storing a set of pressure command values in a memory, each pressure command value corresponding to a time reference value;
prior to application to the control element of a fill pressure pulse, periodically incrementing an absolute time value and setting a shift time value equal to the absolute time value;
in response to the wakeup command, applying to the control element the fill pressure pulse, and during application of the fill pressure pulse, periodically incrementing a base pulse time value, periodically incrementing the absolute time value and preventing incrementing of the shift time value;
when the base pulse time value is equal to a predetermined wakeup time value, setting a wakeup flag, incrementing the absolute time value and setting the shift time value equal to the absolute time value plus a maximum time value less a fill duration time value;
after the wakeup flag is set and the control element is filled, incrementing the absolute time value, comparing the absolute time value to a realignment time value, and if the absolute time value is less than the realignment time value setting the shift time value equal to the absolute time value plus the maximum time value less the fill duration time value, and if the absolute time value is not less than the realignment time value, setting the shift time value equal to the absolute time value plus the maximum time value; and
comparing the shift time values to the time reference values and selecting one of the stored pressure command values from memory;
applying to the control element a pressure corresponding to the selected pressure command value.

* * * * *